J. North,
Snap Hook,
N⁰ 30,084.      Patented Sep. 18, 1860.
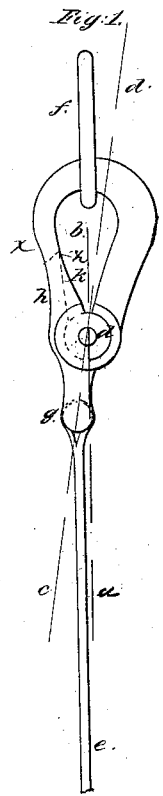
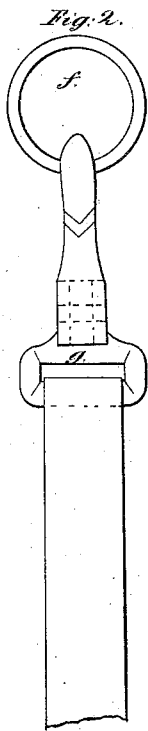
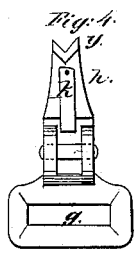
Witnesses:
Ira H. Luthill
Jonathan Fly
Inventor:
John North

UNITED STATES PATENT OFFICE.

JOHN NORTH, OF MIDDLETOWN, CONNECTICUT.

SNAP-HOOK FOR HARNESS.

Specification of Letters Patent No. 30,084, dated September 18, 1860.

*To all whom it may concern:*

Be it known that I, JOHN NORTH, of Middletown, in the State of Connecticut, have invented a new and useful Improvement in what are commonly termed "Snap-Hooks," and that the following, taken in connection with the drawings, is a full, clear, and exact description thereof.

In the drawings Figure 1 is a side elevation of my improved hook with a strap in the eye thereof and a ring inclosed in the hook. Fig. 2 is a front elevation of the same. Fig. 3 is a side view of the hook proper detached and Fig. 4 is a front elevation of the tongue and eye only.

All snap hooks as at present constructed consist so far as I know of four essential parts, viz., the hook proper which contains or holds the article to be held, the eye to which the strap cord or chain is secured, the tongue which shuts the opening of the hook and is pivoted upon the hook, and the spring which always tends to hold the tongue in proper position to close the opening, and in all hooks known to me the eye is made in one piece with the hook and these hooks are not so reliable as they might be for the reason that the spring has the whole duty of holding the tongue in place and when weakened by use performs its duty inefficiently or if broken permits the ring or other article held to fly out of the hook.

The object of my invention is to relieve the spring partially from this duty and to make the hook secure with a broken spring. In the drawings the ring which may be supposed to represent the ring of a horse's bit is shown at $f$, and the strap which represents a rein at $e$. This strap is secured in the eye $g$ and this eye is made in one piece with the tongue $h$. The hook which is shown detached in Fig. 3 has a hole through its shank and is to be pivoted into the eye and tongue as shown in the drawings or in any other convenient manner the precise kind of attachment being unimportant so long as it is sufficiently strong and permits the hook to swing upon the eye and tongue.

A small spring $k$ is to be riveted to the tongue and have its end resting in a small notch $l$ in the hook, the object being to hold the tongue and hook in the relative positions shown in Fig. 1; any other spring so located and attached as to perform this duty will serve instead of the one shown in the drawings.

By observation of Fig. 1 it will be perceived that the eye and tongue are so shaped and attached to the hook that the eye $g$ lies outside of a line $a\ b$ drawn from the end of the strap through the hinge and to the bearing point of the ring inclosed in the hook (see line $d\ e$).

From the fact that the eye is made in one piece with the tongue and from the peculiar shape of the eye and tongue as a whole and their relative position to the bearing point of the hook, it follows that any strain upon the strap causes the end $y$ of the tongue to apply itself closely to the point $x$ of the hook, and the stronger the strain the more closely will the two parts hug together.

If the spring be either weak or broken or removed this result will still take place and it is produced for the reason that the tongue and eye are made in one piece and that the eye has the relative position to the other parts above described.

I therefore claim as of my own invention—

A snap hook in which the eye is made in one piece with the tongue and has a position relative to the bearing point of the hook or that point in which a ring rests substantially such as is hereinbefore described.

In testimony whereof I have hereunto subscribed my name.

JOHN NORTH.

In presence of—
 IRA H. TUTHILL,
 JONATHAN J. ELY.